United States Patent
Cheng et al.

(10) Patent No.: US 11,870,764 B1
(45) Date of Patent: Jan. 9, 2024

(54) DATA EXCHANGE ON A DISTRIBUTED COMPUTING SYSTEM

(71) Applicant: Confluent, Inc., Mountain View, CA (US)

(72) Inventors: Alexander Cheng, Austin, TX (US); Cory Lee Scott, Mountain View, CA (US); Andrew Winthrop Taylor, Redmond, WA (US); Jesse Olin Miller, Berkeley, CA (US); Srinivas Banala, Sammamish, WA (US); Vijay Gopalakrishnan Bharadwaj, Mountain View, CA (US); Mukesh Baphna, Mountain View, CA (US); Priya Shivakumar, Palo Alto, CA (US); Jonathan Alexander Fancey, Medina, WA (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 18/066,082

(22) Filed: Dec. 14, 2022

(51) Int. Cl.
*H04L 9/40* (2022.01)
(52) U.S. Cl.
CPC ............ *H04L 63/08* (2013.01); *H04L 63/102* (2013.01); *H04L 63/20* (2013.01)

(58) Field of Classification Search
CPC ........ H04L 63/08; H04L 63/102; H04L 63/20
USPC .............................................................. 726/4
See application file for complete search history.

(56) References Cited

U.S. PATENT DOCUMENTS

| | | | |
|---|---|---|---|
| 2019/0123983 A1* | 4/2019 | Rao ........................ | H04L 43/062 |
| 2022/0337578 A1* | 10/2022 | Mankekar ............... | G06F 21/41 |
| 2022/0360450 A1* | 11/2022 | Brandenburger ..... | H04L 9/3247 |

* cited by examiner

*Primary Examiner* — Benjamin A Kaplan
(74) *Attorney, Agent, or Firm* — Schwegman Lundberg & Woessner, P.A.

(57) ABSTRACT

A system includes at least one processor and at least one memory including instructions that, when executed by the at least one processor, cause the at least one processor to perform operations. The operations include providing a secure link to an auditable, machine-readable dataset to a client device of a user, the auditable, machine-readable dataset comprising data. At least one policy constraint is provided to at least a portion of the data in the dataset. In response to detecting activation of the secure link at the client device, one or both of the user and the client device is authenticated based on the policy constraint. Streaming access is provided to the auditable, machine-readable dataset in real-time.

20 Claims, 9 Drawing Sheets

DATA EXCHANGE ON A DISTRIBUTED COMPUTING SYSTEM

TECHNICAL FIELD

Examples relate generally to distributed computing environments. More specifically, examples relate to stream processing across distributed computing environments.

BACKGROUND

Cloud-computing systems have grown in popularity as a method of providing computer implemented resources. In cloud computing environments, a data center associated with a cloud provider can provide the computer implemented resources, such as data storage, computing resources, software, intelligence, or analytics, at a location remote from a computing device associated with a user. The data center can provide physical or virtual servers, which can provide the data storage, computing resources, software, intelligence, or analytics for access by the user via their computing device. Further examples can include backup and recovery services, social media, multimedia games, chat applications, and the like.

BRIEF DESCRIPTION OF THE DRAWINGS

Various ones of the appended drawings merely illustrate example examples of the present disclosure and should not be considered as limiting its scope.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

A typical streaming pipeline includes source databases and applications creating events that are coupled to Kafka via connectors. A stream processor filters and aggregates the events. Storage facilities store the events for access by analytics engines. This example includes many moving parts that are prone to breakage or failure and that make scaling, securing, monitoring, debugging, and/or operating all as one difficult.

Examples described herein involve a streaming system for streaming real-time machine-readable data in real time. Many of the moving parts of the streaming system are consolidated into a system that interfaces with both producers and consumers. This allows for a substantially real time stream of data that is machine-readable and/or machine processable. According to various examples, the streaming system is declarative in that the users define a state and the system automatically accommodates the state request. This allows for a streamlined streaming process from a user's point of view.

Figure 1:
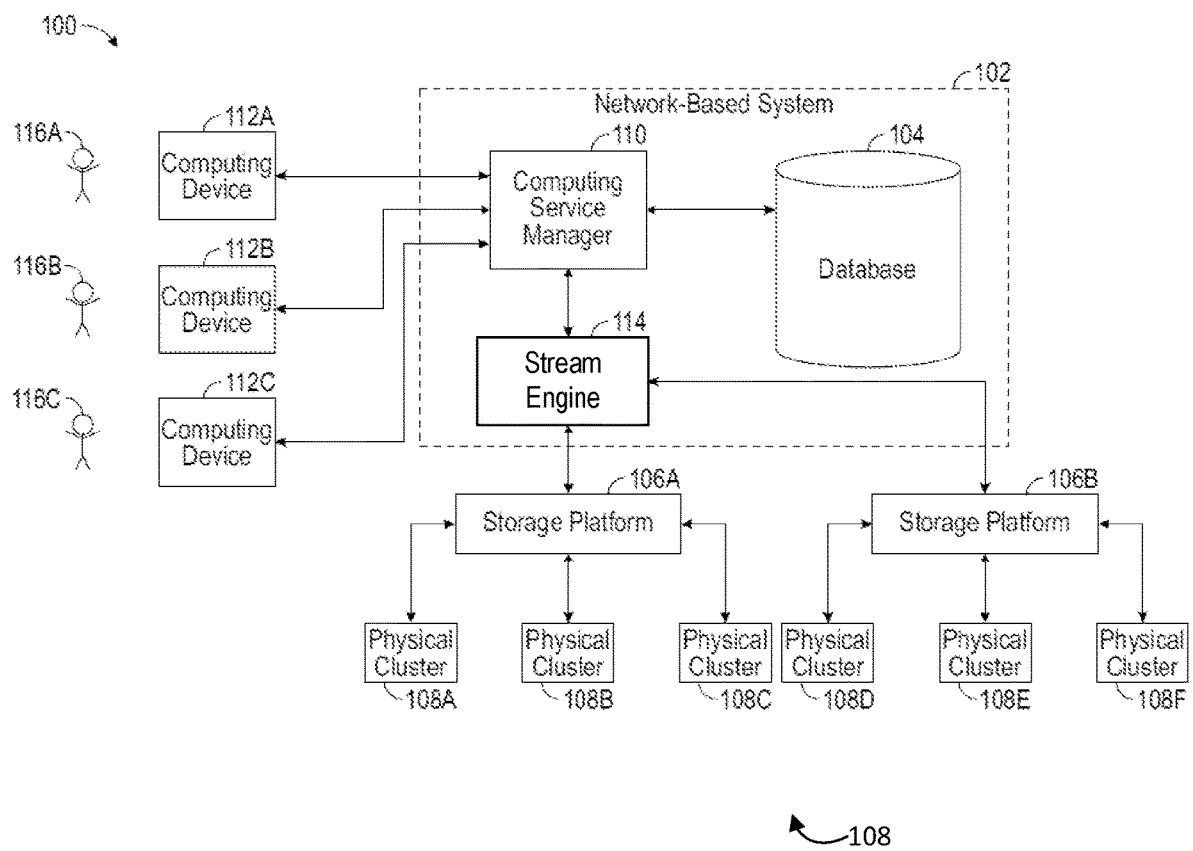
FIG. 1 illustrates a computing environment having a network-based system associated with physical clusters, according to some examples.

Now making reference to FIG. 1, a computing environment 100 is shown in which examples can operate. The environment 100 can include a network-based system 102 that can host and provide data reporting and analysis. The network-based system 102 can include a database 104, which can store data associated with the computing environment 100. The database 104 can store data pertaining to various functions and aspects associated with the network-based system 102. For example, the database 104 can include a summary of data stored in remote data storage systems, such as storage platforms 106A and 106B. Furthermore, the database 104 can include information regarding how data is organized in the storage platforms 106A and 106B and local caches.

In examples, the storage platforms 106A and 106B can be associated with a group 108 of physical clusters 108A-108F and store data associated with the physical clusters 108A-108F. Examples of the storage platforms 106A and 106B that can be used to provide this functionality can include Amazon Web Services™ (AWS™), Microsoft Azure Blob Storage™, Google Cloud Storage™, or the like. The storage platforms 106A and 106B can also include a plurality of computing devices. Furthermore, the storage platforms 106A and 106B can provide various on-demand computer system resources, such as data storage and computing power for devices associated with the computing environment 100. It should be noted that while only two storage platforms, such as the storage platforms 106A and 106B, are shown, any number of storage platforms can be used in accordance with examples.

Figure 2:
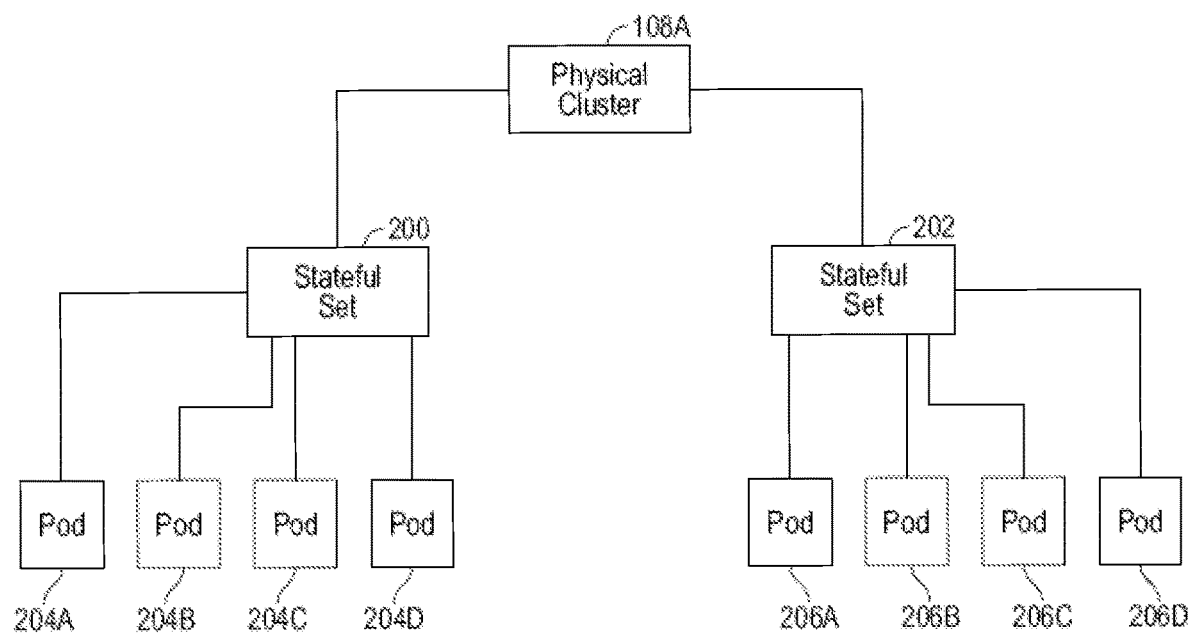
FIG. 2 is an architecture of a physical cluster in the computing environment of FIG. 1, according to some examples.

The network-based system 102 can also be used for the analysis and the reporting of data gleaned from disparate entities, such as the physical clusters 108A-108F. Now making reference to FIG. 2, an example of an architecture associated with the physical cluster 108A is illustrated. It should be noted that while an architecture is shown for the physical cluster 108A, the same description is applicable to each of the physical clusters 108B-108F such that each of the physical clusters 108B-108F can have an architecture similar to that described with reference to FIG. 2. In examples, the physical cluster 108A can be a Kubernetes cluster that utilizes a container orchestration platform to manage applications that are distributed and containerized. Kubernetes is a container management system that allows for the deployment of web applications, batch jobs, and databases via a unified API As shown with reference to FIG. 2, the physical cluster 108A can include stateful sets 200 and 202. In an example, the stateful set 200 can be associated with pods 204A-204D and the stateful set 202 can be associated with pods 206A-206D. The stateful sets 200 and 202 can manage and maintain the respective pods 204A-204D and 206A-206D. The pods 204A-204D and 206A-206D can be a group of one or more containers that can share storage resources along with network resources. Each of the pods 204A-204D and 206A-206D can include several components. To further illustrate, each of the pods 204A-204D and 206A-206D can include an ordinal, stable storage, and a stable network identity. Moreover, each of the pods 204A-204D and 206A-206D can represent an application instance that can run an application within the physical cluster 108A. Examples of an application instance that each of the pods 204A-204D and 206A-206D can run can include Apache Kafka™, Kafka™ structured query language (KSQL), SchemaRegistry, Connect, or the like. In examples, each of the pods 204A-204D and 206A-206D can have their own lifecycle and one of the following states: SETUP, RUN, DISABLED, or DELETED. Moreover, when all the pods 204A-204D are in a RUN state, the stateful set 200 is fully available. Similarly, when all the pods 206A-206D are in a RUN state, the stateful set 202 is fully available.

Each of the stateful sets 200 and 202 can add labels to each of the pods 204A-204D and 206A-206D associated with the stateful sets 200 and 202. In examples, the labels can enable a user associated with the stateful sets 200 and 202 to attach a service to each of the pods 204A-204D and 206A-206D. In examples, each of the stateful sets 200 and 202 can include an ordinal index that assigns the ordinals assigned to the pods 204A-204D and 206A-206D. Furthermore, the stateful sets 200 and 202 can include hostnames, headless services, a domain, and a DNS subdomain associated with the stable network identities of the pods 204A-204D and 206A-206D.

As described above, the techniques described herein can be used in conjunction with, for example, a Kafka or other type of distributed computing environment that, for example, provides distributed streaming or messaging and maintains feeds of messages in topics which are partitioned and replicated across multiple nodes and/or brokers of a cluster.

Although many of the features and techniques described herein are illustrated using the example of a Kafka environment, the features and techniques can be similarly used with other types of distributed computing environments.

Returning attention to FIG. 1 and the computing environment 100, the network-based system 102 can include a computing service manager 110, which can coordinate and manage operations of the network-based system 102. In addition, the computing service manager 110 can manage computing services that provide computing resources for the network-based system 102. Moreover, the computing service manager 110 can be in communication with computing devices 112A-112C. As mentioned above, the pods 204A-204D and 206A-206D can run an application, such as Apache Kafka™, KSQL, SchemaRegistry, Connect, or the like.

In examples, the network-based system 102 can include a stream engine 114 that can implement streaming processes initiated by the users 116A-116C across an entire fleet of clusters associated with one or more network-based systems 102 and managed by the users 116A-116C, such as the physical clusters 108A-108F and the pods 204A-204D and 206A-206D.

A stream is a partitioned, immutable, append-only collection that represents a series of historical facts. For example, the rows of a stream could model a sequence of financial transactions. According to some examples, once a row is inserted into a stream, the row does not change. New rows can be appended at the end of the stream, but existing rows are not updated or deleted. Each row may be stored in a particular partition. Every row, implicitly or explicitly, has a key that represents its identity. All rows with the same key may reside in the same partition.

Throughout this document, reference will be made to the term "entire fleet." It should be noted that a reference to the term "entire fleet" can mean an entire fleet of clusters associated with the network-based system 102 and managed by the users 116A-116C, such as the physical clusters 108A-108F and the pods 204A-204D and 206A-206D. The stream engine 114 can be configured to provide multiple computing resources that execute various data storage and retrieval tasks. As shown with reference to FIG. 1, the stream engine 114 can be coupled with the storage platforms 106A and 106B. It should be noted while the stream engine 114 is shown being coupled to two storage platforms, the stream engine 114 can be coupled to any number of storage platforms having the functionality of the storage platforms 106A and 106B discussed above.

Figure 3A:
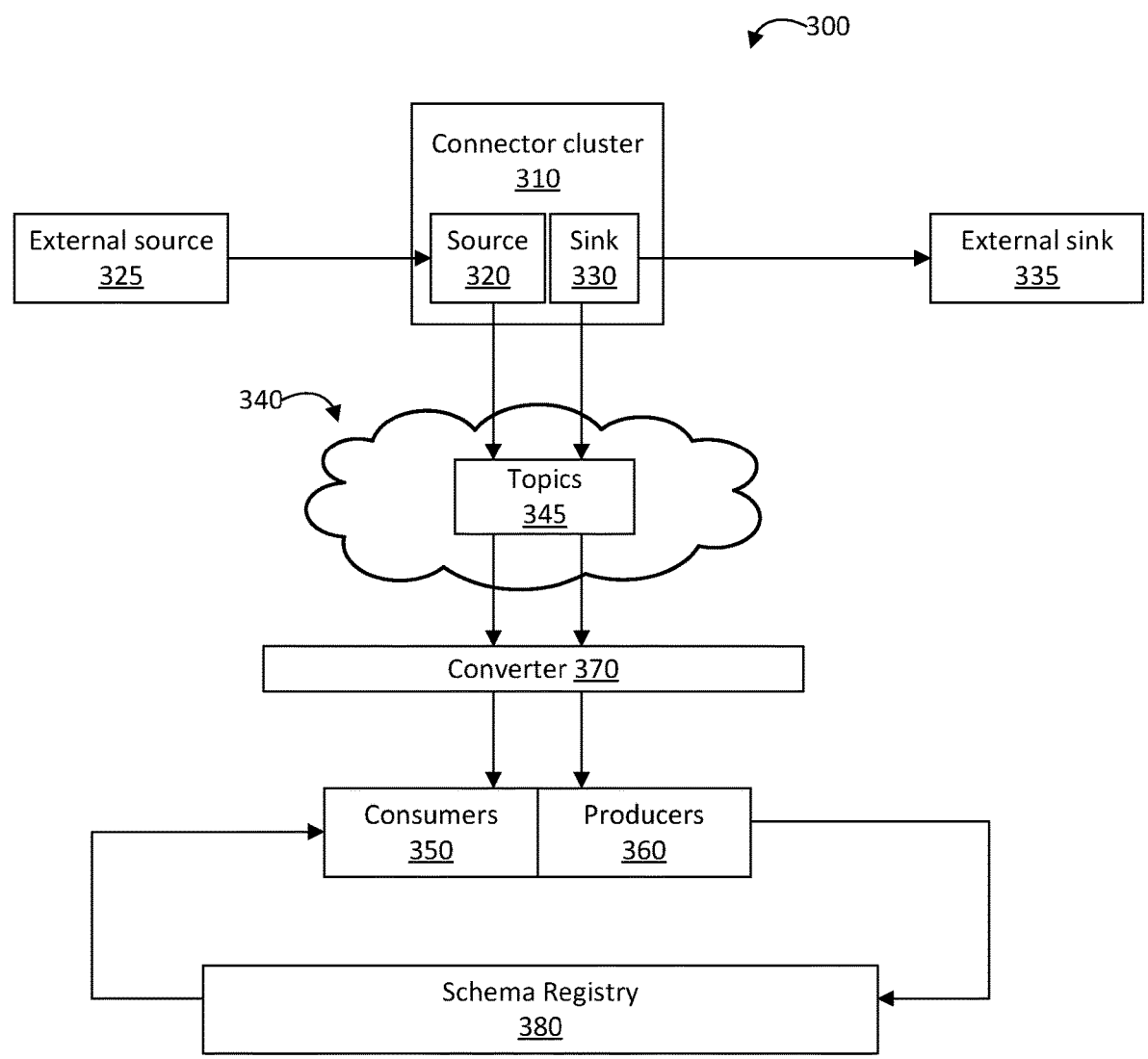
FIGS. 3A and 3B shows a data pipeline for managing clusters for a distributed computing streaming system, according to some examples.

FIG. 3A shows a data pipeline 300 for managing streaming data in clusters in a distributed computing system in accordance with an example. There are three main components to the system shown in FIG. 3A, each with a different role: connectors, tasks, workers, and schemas.

Connectors are responsible for the number of tasks, splitting work between tasks, getting configurations for the tasks from the workers, and passing it to the tasks, for example. According to some examples, there are two types of connectors: source connectors 320 and sink connectors 330 in a connector cluster 310. Connectors are responsible for some of the task management, but may not be responsible for the actual data movement.

Similarly, there may be two different types of corresponding tasks: source tasks and sink tasks. A source task may contain custom code to get data from the source system 325 to Kafka topics 345 within a Kafka cluster 340 via a consumer 350, for example. A sink task uses a Kafka producer 360 to access Kafka topics 345 and read data, and custom code to push data to the sink system 335, for example. Tasks are responsible for getting data into and out of Kafka. According to some examples, tasks are only responsible for getting data into and out of Kafka on the source or sink side and the workers manage data flow to/from Kafka topics). Once started, source tasks may poll source systems and retrieve the data that the workers send to Kafka topics and sink tasks get records from Kafka via the worker, and write the records to the sink system 335.

Workers are the processes that execute the connectors and tasks. They handle various requests that define connectors and configurations, start the connectors and tasks, and pass configurations to the connectors. If using distributed workers, and a worker process dies, then the connectors and tasks associated with the failed worked will be taken over and load balanced among the remaining workers. In an example, a Kafka connect cluster has one (standalone) or more (distributed) workers running on one or more servers. The workers manage connectors and tasks, distributing work among the available worker processes. A connector plugin is a collection of connectors and tasks deployed to each worker.

A converter 370 may be used to handle the serialization and/or deserialization of data. An optional transformer disposed between connectors and converters may provide transformation functionality and can perform one or more transformations to data passing through. For example, the transformers may be configure to perform actions such as dropping fields, changing field types, and/or adding metadata, for example.

A schema registry 380 is coupled to the consumers 350 and producers 360. The schema registry 380 registers and manages one or more schemas. Each schema describes the data being exchanged. For example, each schema defines a structure of the data format by way of metadata, for example.

According to various configurations, the schema registry 380 is a standalone server process that runs on a machine external to the brokers. The schema registry 380 may be configured to maintain a database of all of the schemas that have been written into topics in an associated cluster. That database is persisted in an internal topic and cached in schema registry 380 for low-latency access.

Figure 3B:
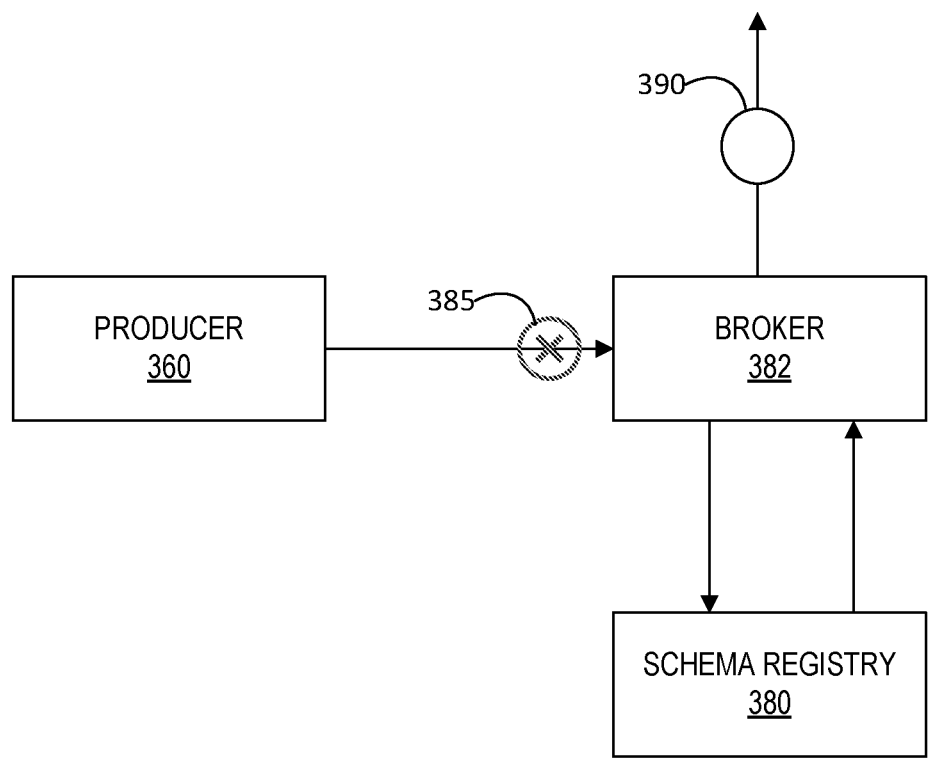

In some examples, the schema registry 380 is an API that allows producers and consumers to predict whether the message they are about to produce or consume is compatible with previous versions. On the producer side, if a new message has a schema that is the same as the last message produced, then the process may succeed. If the schema for the new message is different from the last message but matches the compatibility rules defined for the topic, the process may still succeed. In some examples, the message is different in a way that violates the compatibility rules. In this example, the process will likely fail. FIG. 3B illustrates an example in which an incompatible schema 385 was used. The broker 382 determines that the schema is incompatible by checking the incompatible schema 385 with the schema registry 380. The broker 382 returns an error message 390 to the producer 360 and the error message 390 is discarded.

Figure 4A:
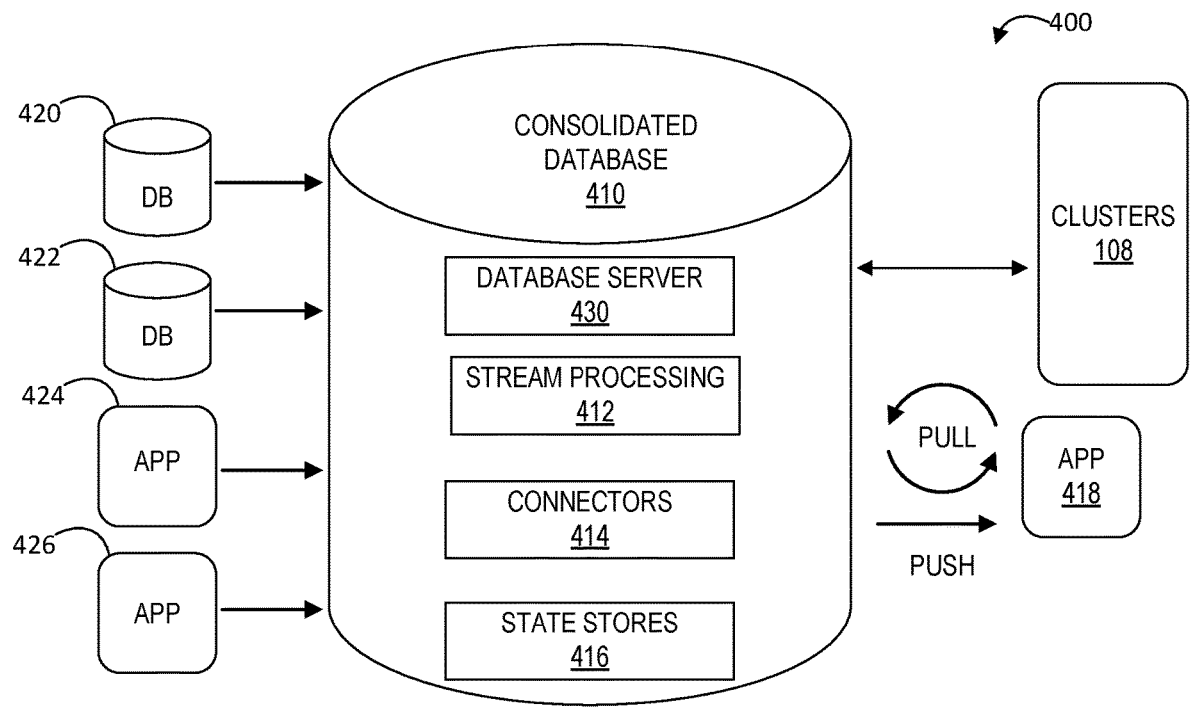
FIG. 4A illustrates a consolidated database streaming system 400 that includes many of the tools that are used to run the streaming operations, according to some examples.

FIG. 4A illustrates a consolidated database streaming system 400 that includes many of the tools that are used to run the streaming operations according to some examples. The consolidated database streaming system 400 includes the consolidated database 410 that receives input from one or more external databases 420, 422 and/or external applications 424, 426. The consolidated database 410 includes various modules that facilitate the streaming process between two or more entities. In this example, the modules include a stream processing module 412, a connectors module 414, and a state stores module 416. It is to be understood that more or fewer modules may be used. In some examples, the modules are configurable by a user of the system 400.

The stream processing module 412 is configured to continuously process real-time data directly as it is produced and/or received from a first entity. For example, stream processing involves modeling computation over unbounded streams of events. Events in stream processing involve anything that occurred and was recorded. For example, an event could include something like the sale of an item or a submission of an invoice. In some examples, an event could be a log line from a web server when a request is received. The consolidated database 410 represents events by using a simple key/value model. The key represents something that can identify the event and the value represents information about the event that occurred. The combination of key and value is used to model stored events. A time that the event occurs may also be stored. According to various examples, the events are auditable and machine-readable. In some implementations, auditable data allows for assessing security risks. For example, the system may log when providers share the link and/or invite with a consumer of the data.

The consolidated database system 400 allows for defining the streaming process declaratively. That is, a desired state of the system may be defined by a user and the consolidated database system accommodates the request by automatically managing the streaming system based on the desired state. The state stores module 416 serves as a local cache of topic data that improves workload performance.

In some examples, the consolidated database may perform stream processing and may include primitives for connectors to external systems stored in the connectors module 414 based on the desired state. ores module 416 includes materialized views. These materialized views may be used to directly query data similarly to a database table without being sent to an external source. For example, a benefit of a materialized view is that it evaluates a query on the changes only instead of evaluating the query on the entire table. When a new event is integrated, the current state of the view evolves into a new state. This transition happens by applying an aggregation function that defines the view with the current state and the new event. When a new event is integrated, the aggregation function that defines the view is applied only on this new event, leading to a new state for the view. This allows for a view that is never fully recomputed when new events arrive. Instead, the view adjusts incrementally to account for the new information. This process allows queries against materialized views that are highly efficient.

Examples described herein use two options for querying data from an application 418 as a part of the streaming process: pull queries and push queries as shown in FIG. 4A. Pull queries may be run against materialized views, for example. Push queries are similar to traditional database queries in which data is queried and a response is received. A response from a pull query may include the current state of the table (e.g., the materialized view) at that specific point in time. Push queries let you subscribe to a stream of updates, and they stay alive until you stop them. When a push query is run against a table, you only receive a response when the state changes. The threshold for receiving a response can be set by a user. In an example, a response may be received every time an average reading for a sensor changes or when a location of a client device changes. According to various configurations, push queries allow for receipt of a response as it changes in real-time.

Figure 4B:
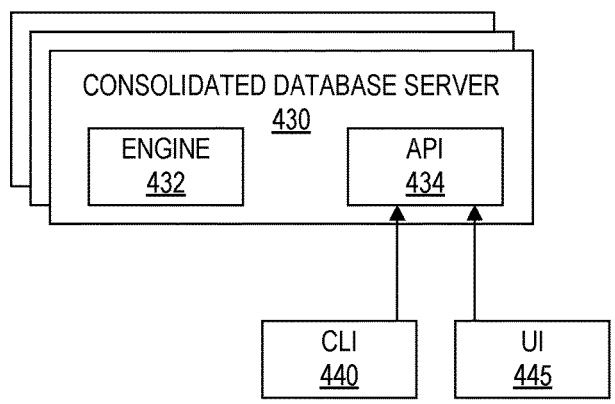
FIG. 4B shows components of a consolidated database server, according to some examples.

FIG. 4B shows components of a consolidated database server 430 in accordance with some examples. The engine 432 processes database statements and queries. According to some examples the database statements and queries are SQL statements and queries. An API 434 allows for client to access the engine. According to various configurations, the API 434 is a REST interface. A command line interface (CLI) 440 may be coupled to the API to 434 provide commands to the consolidated database system. A user-interface (UI) 445 is coupled to the API 434 to enable the development of consolidated database applications. The consolidated server instances communicate with one or more Kafka clusters 108. According to various examples, instances can be added as desired without restarting applications.

Figure 5:
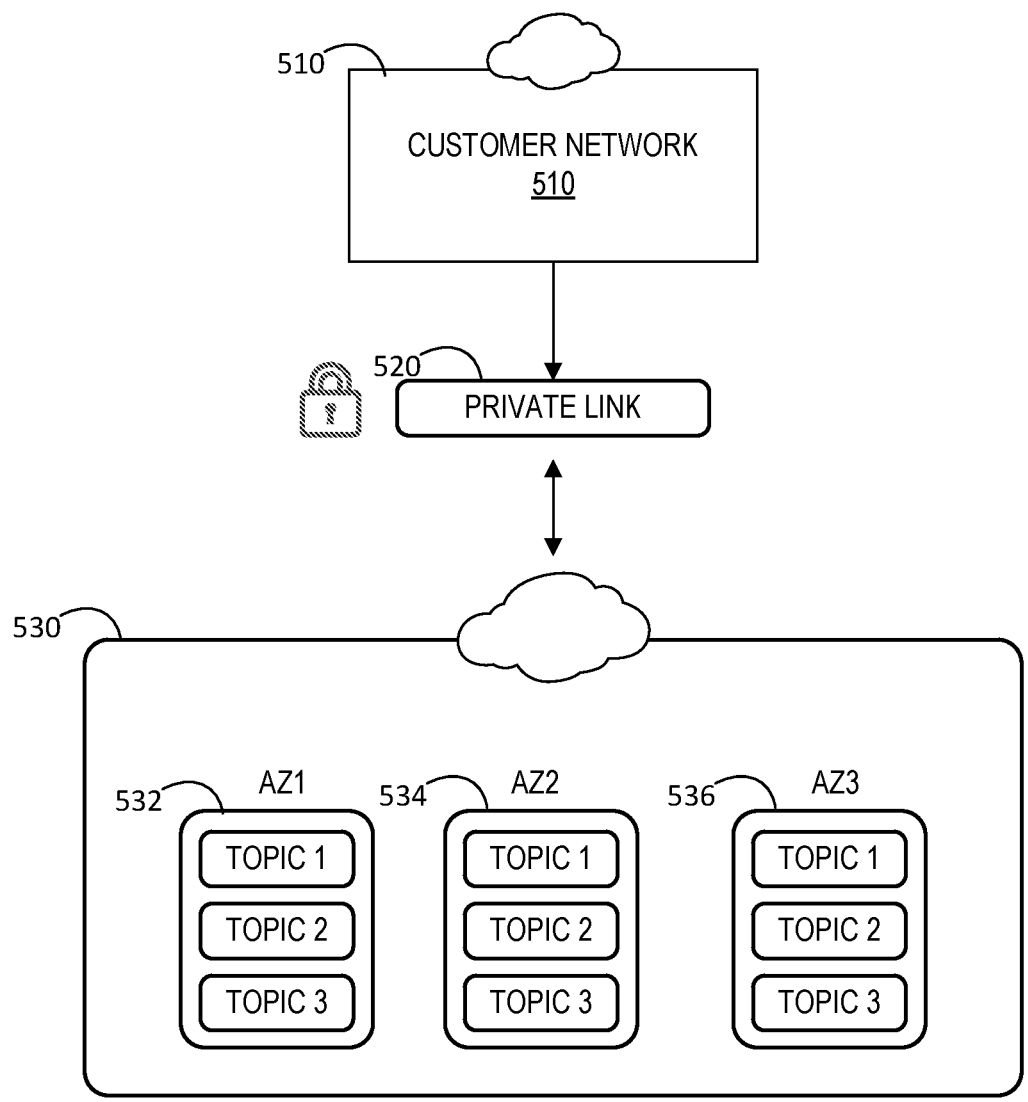
FIG. 5 shows a streaming process between a consumer and a producer, according to some examples.

A streaming process between a consumer (e.g. customer) and a producer (e.g. business) is shown in FIG. 5. In this example, a customer network 510 receives a private link 520 to stream a dataset on the cloud 530. According to various configurations, a streaming session can be initiated by customer by activating the private link 520. The customer may receive a private link for a stream of auditable, machine-readable and/or machine processable data. For example the data may be in one or more of CSV, RDF, XML, and JSON format. Upon activation, the link 520 may allow the customer to stream the data in real-time. In some examples, the customer can request streaming access to a particular dataset and upon authentication, is allowed to stream the dataset. The dataset may include one or more clusters 532, 534, 536 of data. In this example, each cluster contains three topics. It is to be understood that more or fewer clusters and/or topics can make up the streamable dataset.

According to various configurations, security settings for a dataset can be configured by a user of the system. The dataset may be configurable to be encrypted, for example. According to some configurations, a producer of the dataset may be able to configure the security settings to allow for limited access to the data. For example, the producer may be able to provide at least one policy constraint to the data. In some examples, a policy constraint may cause a portion of the dataset may be redacted and/or withheld. For example, a dataset that contains personal information may have portions of the data redacted such as social security numbers and other sensitive information. In some cases, the policy constraint defines what types of customer applications allowed to stream the dataset.

Figure 6:
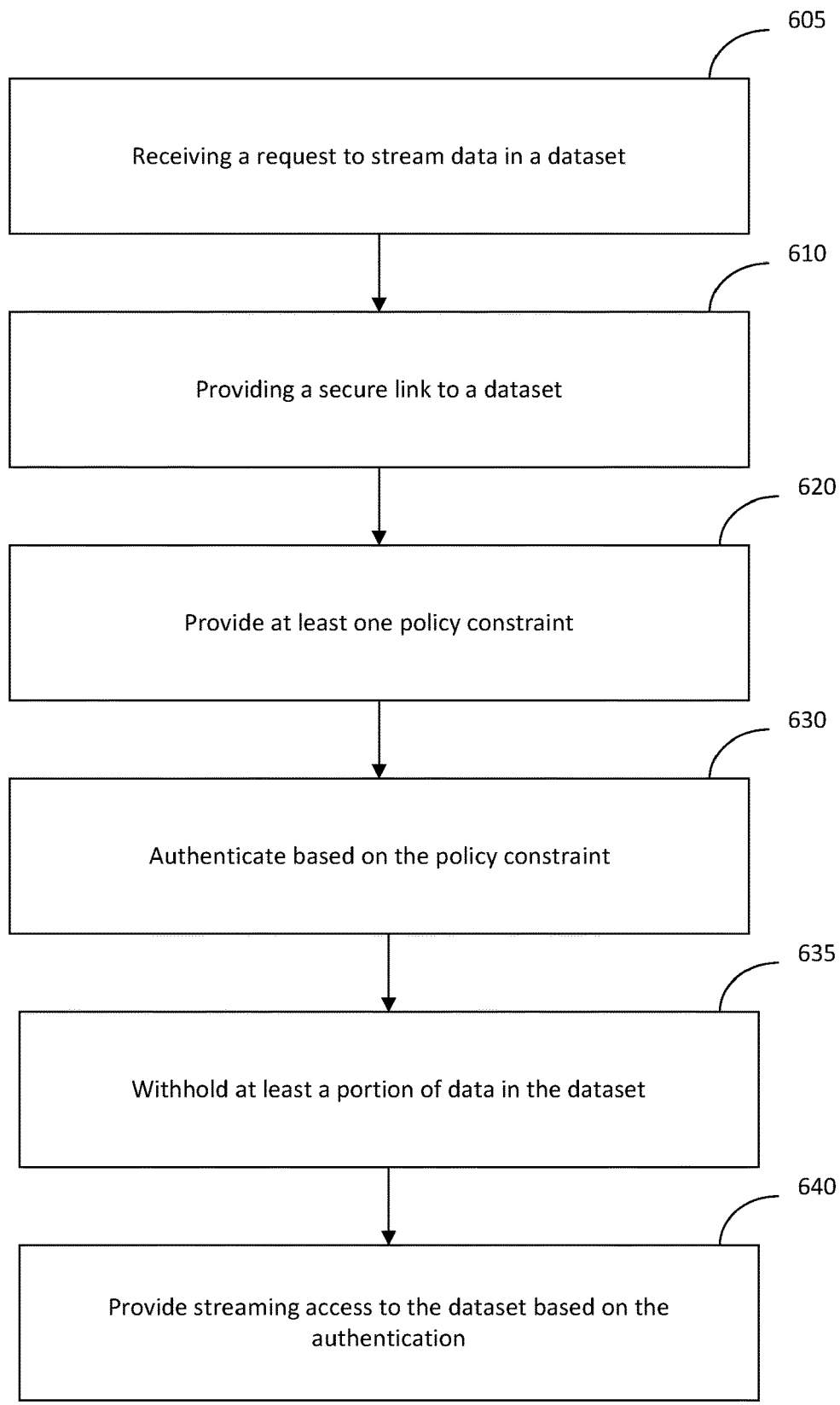
FIG. 6 illustrates a process of streaming an auditable machine-readable dataset, according to some examples.

FIG. 6 illustrates a process of streaming an auditable machine-readable dataset in accordance with various examples described herein. A streaming system receives 605 a request to access a machine-readable, auditable dataset. In response to the request, the streaming system provides 610 a secure link to the dataset comprising data to a client device of a user. Access to a schema associated with the data that contains information about the dataset may be provided with the dataset. For example, the schema may include information about a data type, one or more data field titles, and one or more data field types. According to various examples, the secure link is provided via an email address of the customer, for example, upon a customer request to access the dataset. It is to be understood that the link can be provided via any type of electronic message such as a text message. In some examples a format of the data can be updated based on a request received from a user of the system. For example, a customer can request that the format be updated.

The streaming system provides 620 at least one policy constraint associated with at least some of the data in the dataset. For example, at least one of the data in the dataset may be withheld 635 based on the policy constraint. In some examples, at least some of the data may be withheld based on an authentication failure of the user and/or an application of the client device.

In response to detecting activation of the secure link, the streaming system authenticates 630 one or both of the user and the client device based on the policy constraint. The streaming system provides 640 streaming access to the auditable, machine-readable dataset in real-time.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 7 and 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices. In examples, communication links between elements of the computing environment 100 are implemented via one or more data communication networks. These data communication networks may utilize any wired or wireless communication protocol and any type of communication medium. In some embodiments, the data communication networks are a combination of two or more data communication networks (or sub-networks) coupled to one another.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-6 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 7:
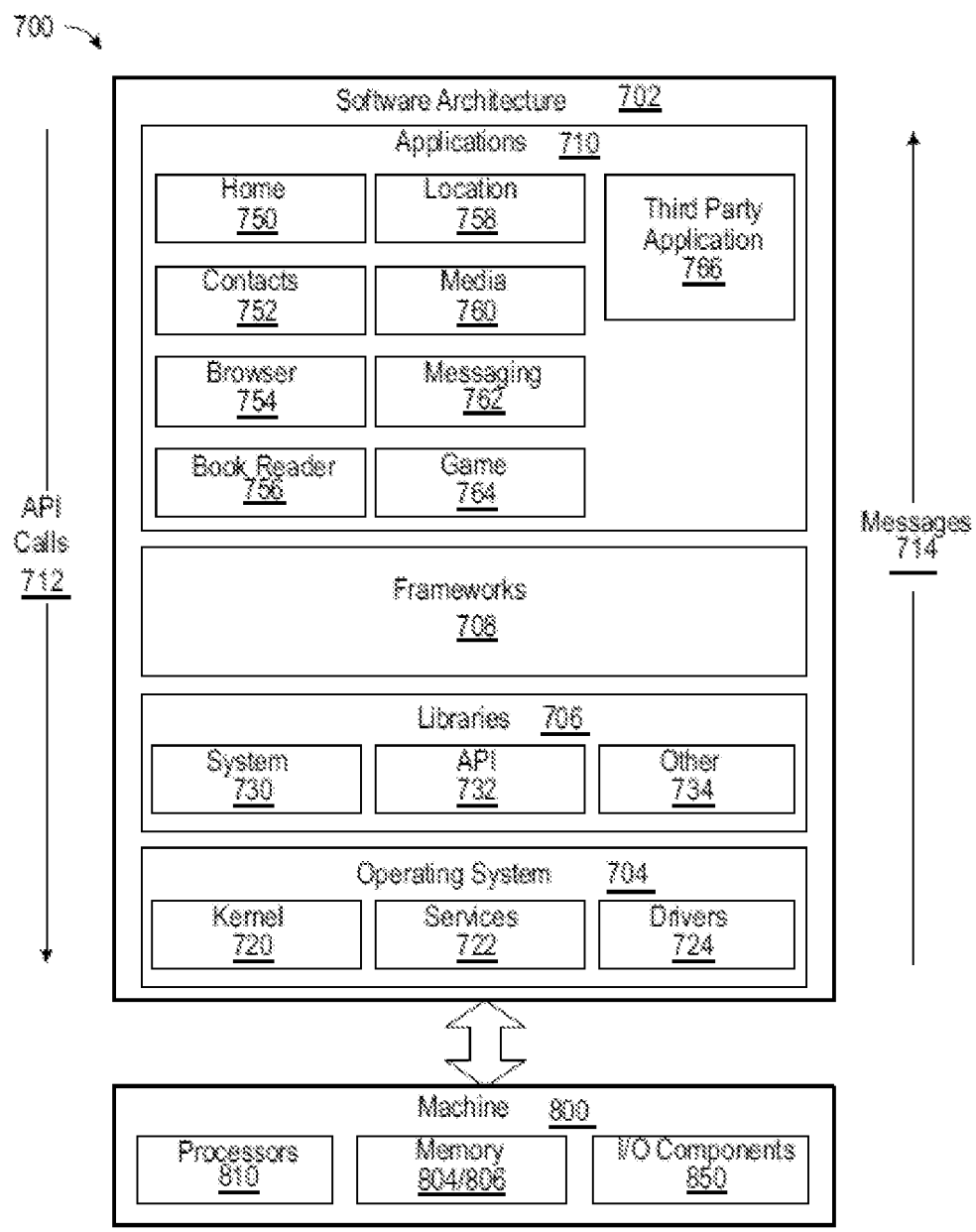
FIG. 7 is a block diagram illustrating architecture of software, according to some examples.

FIG. 7 is a block diagram 700 illustrating a software architecture 702, which may be installed on any one or more of the devices described above. FIG. 7 is merely a non-limiting example of a software architecture, and it will be appreciated that many other architectures may be implemented to facilitate the functionality described herein. The software architecture 702 may be implemented by hardware such as a machine 800 of FIG. 8 that includes a processor 802, memory 804 and 806, and I/O components 810-814. In this example, the software architecture 702 may be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, according to some implementations.

In various implementations, the operating system 704 manages hardware resources and provides common services. The operating system 704 includes, for example, a kernel 720, services 722, and drivers 724. The kernel 720 acts as an abstraction layer between the hardware and the other software layers in some implementations. For example, the kernel 720 provides memory management, processor management (e.g., scheduling), component management, networking, and security settings, among other functionalities. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), WiFi® drivers, audio drivers, power management drivers, and so forth.

In some implementations, the libraries 706 provide a low-level common infrastructure that may be utilized by the applications 710. The libraries 706 may include system libraries 730 (e.g., C standard library) that may provide functions such as memory allocation functions, string manipulation functions, mathematic functions, and the like. In addition, the libraries 706 may include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 may also include a wide variety of other libraries 734 to provide many other APIs to the applications 710.

The frameworks 708 provide a high-level common infrastructure that may be utilized by the applications 710, according to some implementations. For example, the frameworks 708 provide various graphic user interface (GUI) functions, high-level resource management, high-level location services, and so forth. The frameworks 708 may provide a broad spectrum of other APIs that may be utilized by the applications 710, some of which may be specific to a particular operating system or platform.

According to some examples, the applications 710 are programs that execute functions defined in the programs. Various programming languages may be employed to create one or more of the applications 710, structured in a variety of manners, such as object-orientated programming languages (e.g., Objective-C, Java, or C++) or procedural programming languages (e.g., C or assembly language). In a specific example, the third-party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 766 may invoke the API calls 712 provided by the mobile operating system (e.g., the operating system 704) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 8:
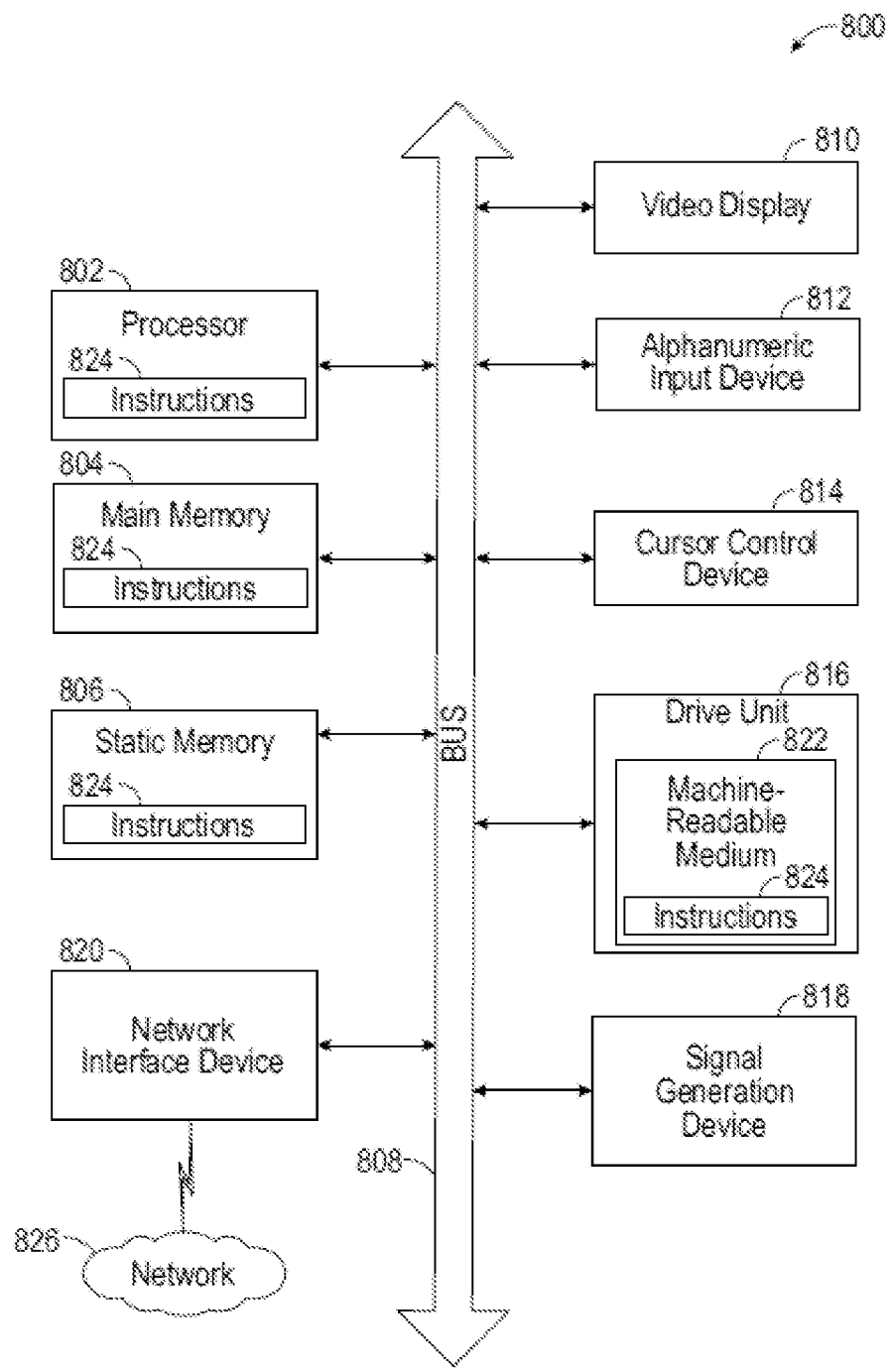
FIG. 8 shows a machine as an example computer system with for cluster deployment, according to some examples.

FIG. 8 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The machine 800, which can be a computer system, includes the processor 802 (e.g., a central processing unit (CPU), a graphics processing unit (GPU) or both), a main memory 804 and a static memory 806, which communicate with each other via a bus 808. The machine 800 may further include a video display unit 810 (e.g., a liquid crystal display (LCD) or a cathode ray tube (CRT)). The machine 800 also includes an alphanumeric input device 812 (e.g., a keyboard), a user interface (UI) navigation device (cursor control device) 814 (e.g., a mouse), a disk drive unit 816, a signal generation device 818 (e.g., a speaker) and a network interface device 820.

The drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the machine 800, the main memory 804 and the processor 802 also constituting machine-readable media. Instructions 824 may also reside within the static memory 806.

While the machine-readable medium 822 is shown in an example to be a single medium, the term "machine-readable medium" may include a single medium or multiple media (e.g., a centralized or distributed database, and/or associated caches and servers) that store the one or more instructions or data instructions 824. The term "machine-readable medium" shall also be taken to include any tangible medium that is capable of storing, encoding or carrying instructions 824 for execution by the machine and that cause the machine to perform any one or more of the methodologies of the present invention, or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 824 for execution by the machine, and includes digital or analog communications signals or other intangible media to facilitate communication of such software.

Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The various memories and/or storage unit may store one or more sets of instructions and data structures (e.g., software) embodying or utilized by any one or more of the methodologies or functions described herein. These instructions, when executed by processor(s), cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of network, such as the network-based system 102 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. To further illustrate, a network or a portion of a network may include a wireless or cellular network, where a coupling may be a Code Division Multiple Access (CDMA) connection, a Global System for Mobile communications (GSM) connection, or another type of cellular or wireless coupling. In this illustration, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions may be transmitted or received over a network using a transmission medium via a network interface device and utilizing any one of a number of well-known transfer protocols (e.g., hypertext transfer protocol (HTTP)). Similarly, the instructions may be transmitted or received using a transmission medium via the coupling (e.g., a peer-to-peer coupling) to devices. The terms "transmission medium" and "signal medium" mean the same thing and may be used interchangeably in this disclosure. The terms "transmission medium" and "signal medium" shall be taken to include any intangible medium that is capable of storing, encoding, or carrying instructions for execution by a machine, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method comprising:
   receiving a request to access an auditable, machine-readable dataset from a user;
   in response to receiving the request, providing a secure link to the auditable, machine-readable dataset via an email or text message to a client device of the user, the auditable, machine-readable dataset comprising data;
   providing at least one policy constraint to at least a portion of the data in the dataset; and
   in response to detecting activation of the secure link at the client device:
      authenticating one or both of the user and the client device based on the policy constraint; and
      based on authenticating one or both of the user and the client device, providing streaming access to the auditable, machine-readable dataset in real-time.

2. The method of claim 1, further comprising withholding, from the client device, at least the portion of the data of the dataset based on the policy constraint.

3. The method of claim 2, further comprising, in response to failing to authenticate one or both of the user and the client device, withholding at least the portion of the data.

4. The method of claim 1, wherein:
   the auditable, machine-readable dataset comprises one or more clusters of data and each cluster contains one or more topics.

5. The method of claim 1, wherein the policy constraint defines what types of customer applications are allowed to stream the auditable, machine-readable dataset.

6. The method of claim 1, wherein providing the secure link comprises providing the secure link to at least the portion of the data in the dataset and an associated schema to the client device of the user.

7. The method of claim 6, wherein the associated schema comprises information about the data.

8. The method of claim 7, wherein the information about the data comprises one or more of a data type, one or more data field titles, or one or more data field types.

9. The method of claim 1, further comprising updating a format of the dataset in response to a second request from the user.

10. The method of claim 1, wherein the dataset comprises one or more Kafka clusters.

11. The method of claim 1, wherein the dataset is in a machine-processable format.

12. The method of claim 1, wherein a format of the dataset comprises one or more of CSV, RDF, XML, or JSON.

13. A system comprising:
at least one processor; and
at least one memory including instructions that, when executed by the at least one processor, cause the at least one processor to perform operations comprising:
receiving a request to access an auditable, machine-readable dataset from a user;
in response to receiving the request, providing a secure link to the auditable, machine-readable dataset via an email or text message to a client device of the user, the auditable, machine-readable dataset comprising data;
providing at least one policy constraint to at least a portion of the data in the dataset; and
in response to detecting activation of the secure link at the client device:
authenticating one or both of the user and the client device based on the policy constraint; and
based on authenticating one or both of the user and the client device, providing streaming access to the auditable, machine-readable dataset in real-time.

14. The system of claim 13, wherein the operations further comprise withholding, from the client device, the at least some data of the dataset based on the policy constraint.

15. The system of claim 14, wherein the operations further comprise, in response to failing to authenticate one or both of the user and the client device, withholding at least some of the dataset.

16. The system of claim 13, wherein the policy constraint defines what types of customer applications are allowed to stream
the auditable, machine-readable dataset.

17. The system of claim 13, wherein the dataset comprises or more Kafka clusters.

18. The system of claim 13, wherein the operations further comprise updating a format of the dataset in response to a second request from the user.

19. The system of claim 13, wherein a format of the dataset comprises one or more of CSV, RDF, XML, and JSON.

20. A machine-storage medium having instructions embodied thereon, the instructions executable by a processor of a machine to perform operations comprising:
receiving a request to access an auditable, machine-readable dataset from a user;
in response to receiving the request, providing a secure link to the auditable, machine-readable dataset via an email or text message to a client device of the user, the auditable, machine-readable dataset comprising data;
providing at least one policy constraint to at least a portion of the data in the dataset; and
in response to detecting activation of the secure link at the client device:
authenticating one or both of the user and the client device based on the policy constraint; and
based on authenticating one or both of the user and the client device, providing streaming access to the auditable, machine-readable dataset in real-time.

* * * * *